United States Patent
Zhang et al.

(10) Patent No.: US 11,973,591 B2
(45) Date of Patent: *Apr. 30, 2024

(54) SYSTEM AND METHOD FOR FAST SINGLE-DCI AND MULTI-DCI MODE SWITCHING

(71) Applicant: Apple Inc., Cupertino, CA (US)

(72) Inventors: Yushu Zhang, Beijing (CN); Chunhai Yao, Beijing (CN); Chunxuan Ye, San Diego, CA (US); Dawei Zhang, Saratoga, CA (US); Fangli Xu, Beijing (CN); Haijing Hu, Beijing (CN); Haitong Sun, Irvine, CA (US); Hong He, Cupertino, CA (US); Jie Cui, San Jose, CA (US); Oghenekome Oteri, San Diego, CA (US); Wei Zeng, San Diego, CA (US); Weidong Yang, San Diego, CA (US); Yang Tang, Cupertino, CA (US); Yuchul Kim, Santa Clara, CA (US); Yuqin Chen, Shenzhen (CN)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/295,486

(22) Filed: Apr. 4, 2023

(65) Prior Publication Data

US 2023/0246736 A1   Aug. 3, 2023

Related U.S. Application Data

(63) Continuation of application No. 17/091,194, filed on Nov. 6, 2020, now Pat. No. 11,658,769.

(30) Foreign Application Priority Data

Nov. 7, 2019 (CN) .......................... 201911086315.1

(51) Int. Cl.
*H04L 1/00* (2006.01)
*H04L 5/00* (2006.01)
*H04W 76/15* (2018.01)

(52) U.S. Cl.
CPC .......... *H04L 1/0038* (2013.01); *H04L 5/0023* (2013.01); *H04L 5/0092* (2013.01); *H04W 76/15* (2018.02)

(58) Field of Classification Search
CPC ... H04L 1/0038; H04L 5/0023; H04L 5/0053; H04L 5/0091; H04L 5/0092; H04W 72/23; H04W 76/15
See application file for complete search history.

(56) References Cited

U.S. PATENT DOCUMENTS

2012/0033627 A1   2/2012   Li
2018/0019794 A1   1/2018   Kowalski
(Continued)

FOREIGN PATENT DOCUMENTS

WO   2019193581   10/2019

OTHER PUBLICATIONS

Partial European Search Report for EP Application No. 20203811.3, dated Mar. 16, 2021.
(Continued)

*Primary Examiner* — Gary Mui
(74) *Attorney, Agent, or Firm* — Kowert, Hood, Munyon, Rankin & Goetzel, P.C.

(57) ABSTRACT

Embodiments are presented herein of apparatuses, systems, and methods for a user equipment device (UE) and/or cellular network to perform downlink control information (DCI) mode signaling and control resource set (CORESET) selection. A DCI mode may be signaled based on a predefined rule, media access control (MAC) control element (CE), and/or group based beam reporting. One or more
(Continued)

CORESETs may be selected based on configuration of an active bandwidth part (BWP), CORESET identifier, higher layer index, periodicity, type of search space, and/or MAC CE.

20 Claims, 10 Drawing Sheets

(56) References Cited

U.S. PATENT DOCUMENTS

| | | | |
|---|---|---|---|
| 2019/0141693 A1 | 5/2019 | Guo |
| 2019/0166588 A1 | 5/2019 | Abdel Shahid |
| 2019/0223033 A1 | 7/2019 | Nam |
| 2019/0320469 A1 | 10/2019 | Huang |
| 2019/0327115 A1 | 10/2019 | Zhang |
| 2020/0107400 A1 | 4/2020 | Sun |
| 2021/0091915 A1 | 3/2021 | Khoshnevisan |
| 2021/0112542 A1 | 4/2021 | Zhou |
| 2021/0352629 A1 | 11/2021 | Haghighat |
| 2022/0294591 A1 | 9/2022 | Liu |

OTHER PUBLICATIONS

ZTE "Enhancements on Multi-TRP and Multi-panel Transmission"; 3GPP TSG RAN WG1 #96bis, R1-1904013, Xi'an, China, Apr. 8-12, 2019.
Huawei et al. "Enhancements on multi-TRP/panel transmision", 3GPP TSG RAN WG1 Meeting #95, R1-1812243, Spokane, USA, Nov. 12-16, 2018.
Extended European Search Report for EP Application No. 23202621.1; dated Jan. 26, 2024.
ZTE "Enhancements on Multi-TRP and Multi-panel Transmission"; 3GPP TSG RAN WG1 #96bis, R1-1910284; Oct. 14, 2019.

Single-DCI Mode

Multi-DCI Mode

| Serving Cell ID | | | | | | | | | |
|---|---|---|---|---|---|---|---|---|---|
| C4 | C5 | C6 | C7 | C8 | C9 | C10 | C3 | | Oct 1 |
| | | | | | C9 | C10 | C11 | | Oct 2 |

SYSTEM AND METHOD FOR FAST SINGLE-DCI AND MULTI-DCI MODE SWITCHING

PRIORITY CLAIM

This application This application is a continuation of U.S. patent application Ser. No. 17/091,194, entitled "System and Method for Fast Single-DCI and Multi-DCI Mode Switching," filed Nov. 6, 2020, which claims benefit of priority to Chinese Application No. 201911086315.1, titled "System and Method for Fast Single-DCI and Multi-DCI Mode Switching", filed Nov. 7, 2019, which is hereby incorporated by reference in its entirety as though fully and completely set forth herein. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

TECHNICAL FIELD

The present application relates to wireless devices, and more particularly to apparatuses, systems, and methods for switching modes for downlink control information (DCI).

DESCRIPTION OF THE RELATED ART

Wireless communication systems are rapidly growing in usage. Wireless devices, particularly wireless user equipment devices (UEs), have become widespread. Additionally, there are a variety of applications (or apps) hosted on UEs that perform or depend on wireless communication, such as applications that provide messaging, email, browsing, video streaming, short video, voice streaming, real-time gaming, or various other online services.

In some instances, a UE may communicate with one or more base station (BS). In order to receive downlink control information (DCI), a UE may operate in either a single-DCI mode (e.g., receiving DCI from one BS, which may be applicable to one or more additional BS) or a multi-DCI mode (e.g., receiving DCI from multiple BSs). Transitions between single-DCI mode and multi-DCI mode may result in latency and overhead. Accordingly, improvements in the field may be desired.

SUMMARY

Techniques, apparatuses, systems, and methods are disclosed for a user equipment device (UE) and cellular network to perform mode switching between single-DCI and multi-DCI modes and to select control resource sets (CORESETs) for monitoring.

In some embodiments, a UE may establish a connection with a cellular network. The UE may detect a DCI mode switch. Among various possibilities, the UE may detect the mode switch based on a predefined rule, based on signaling from the network, and/or based on group based beam reporting.

In some embodiments, the UE may determine one or more CORESETs to monitor. Among various possibilities, the UE may select the CORESETs based on CORESETs configured for an active bandwidth part (BWP), selecting a subset of CORESETs, and/or based on higher layer signaling.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the disclosed embodiments can be obtained when the following detailed description is considered in conjunction with the following drawings, in which:

FIG. 15 illustrates an example MAC CE, according to some embodiments.

Figure 1:
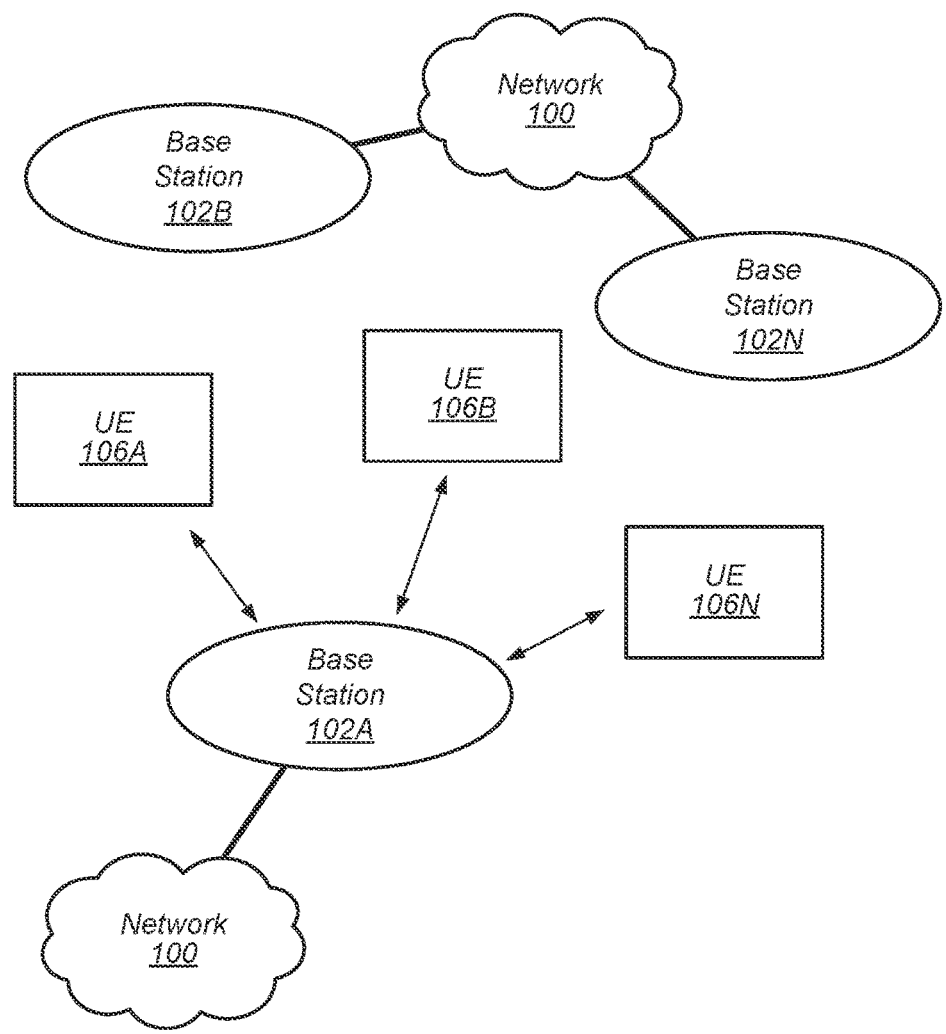
FIG. 1 illustrates an example wireless communication system, according to some embodiments.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Acronyms

The following acronyms may be used in the present Patent Application:
UE: User Equipment
BS: Base Station
ENB: eNodeB (Base Station)
gNB: gNodeB (Base Station)

TRP: transmission—reception point (Base Station)
NR: new radio
LTE: Long Term Evolution
VoLTE: voice over LTE
UMTS: Universal Mobile Telecommunications System
RAT: Radio Access Technology
RAN: Radio Access Network
E-UTRAN: Evolved UMTS Terrestrial RAN
CN: Core Network
EPC: Evolved Packet Core
MME: Mobile Management Entity
HSS: Home Subscriber Server
SGW: Serving Gateway
PS: Packet-Switched
CS: Circuit-Switched
EPS: Evolved Packet-Switched System
RRC: Radio Resource Control
IE: Information Element
UL: uplink
DL: downlink
DCI: downlink control information
RS: reference signal
PLMN: Public Land Mobile Network Terms The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPGAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer system devices which performs wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 2:
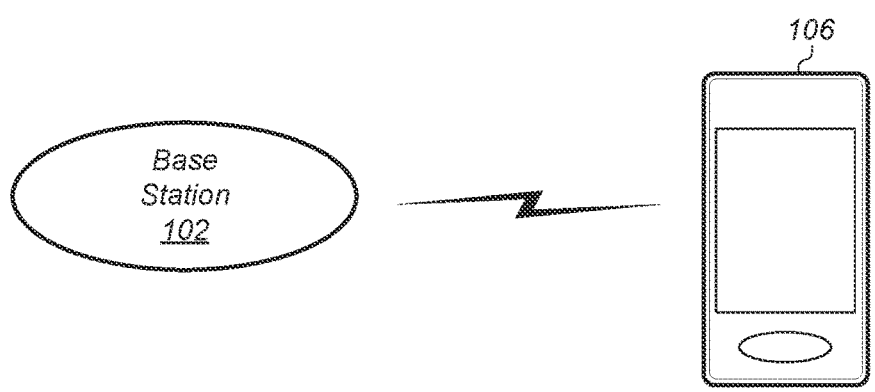
FIG. 2 illustrates a base station (BS) in communication with a user equipment (UE) device, according to some embodiments.

FIGS. 1 and 2—Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102 which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102 may be a base transceiver station (BTS) or cell site (a "cellular base station"), and may include hardware that enables wireless communication with the UEs 106A through 106N.

The communication area (or coverage area) of the base station may be referred to as a "cell." The base station 102 and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1xRTT, 1xEV-DO, HRPD, eHRPD), etc. Note that if the base station 102 is implemented in the context of LTE, it may alternately be referred to as an 'eNodeB' or 'eNB'. Note that if the base station 102 is implemented in the context of 5G NR, it may alternately be referred to as 'gNodeB' or 'gNB'.

As shown, the base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the user devices and/or between the user devices and the network 100. In particular, the cellular base station 102 may provide UEs 106 with various telecommunication capabilities, such as voice, SMS and/or data services.

Base station 102 and other similar base stations operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102 may act as a "serving cell" for UEs 106A-N as illustrated in FIG. 1, each UE 106 may also be capable of receiving signals from (and possibly within communication range of) one or more other cells (which might be provided by other base stations 102B-N), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. Other configurations are also possible.

In some embodiments, base station 102 may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1xRTT, 1xEV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1xRTT/1xEV-DO/HRPD/eHRPD) or LTE using a single shared radio and/or GSM or LTE using the single shared radio. The shared radio may couple to a single antenna, or may couple to multiple antennas (e.g., for multiple-input, multiple-output or "MIMO") for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include any number of antennas and may be configured to use the antennas to transmit and/or receive directional wireless signals (e.g., beams). Similarly, the BS 102 may also include any number of antennas and may be configured to use the antennas to transmit and/or receive directional wireless signals (e.g., beams). To receive and/or transmit such directional signals, the antennas of the UE 106 and/or BS 102 may be configured to apply different "weight" to different antennas. The process of applying these different weights may be referred to as "precoding".

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1xRTT or LTE or GSM), and separate radios for communicating using each of Wi-Fi and Bluetooth. Other configurations are also possible.

In some embodiments, UE 106 may communicate (e.g., concurrently) with multiple BS 102s.

Figure 3:
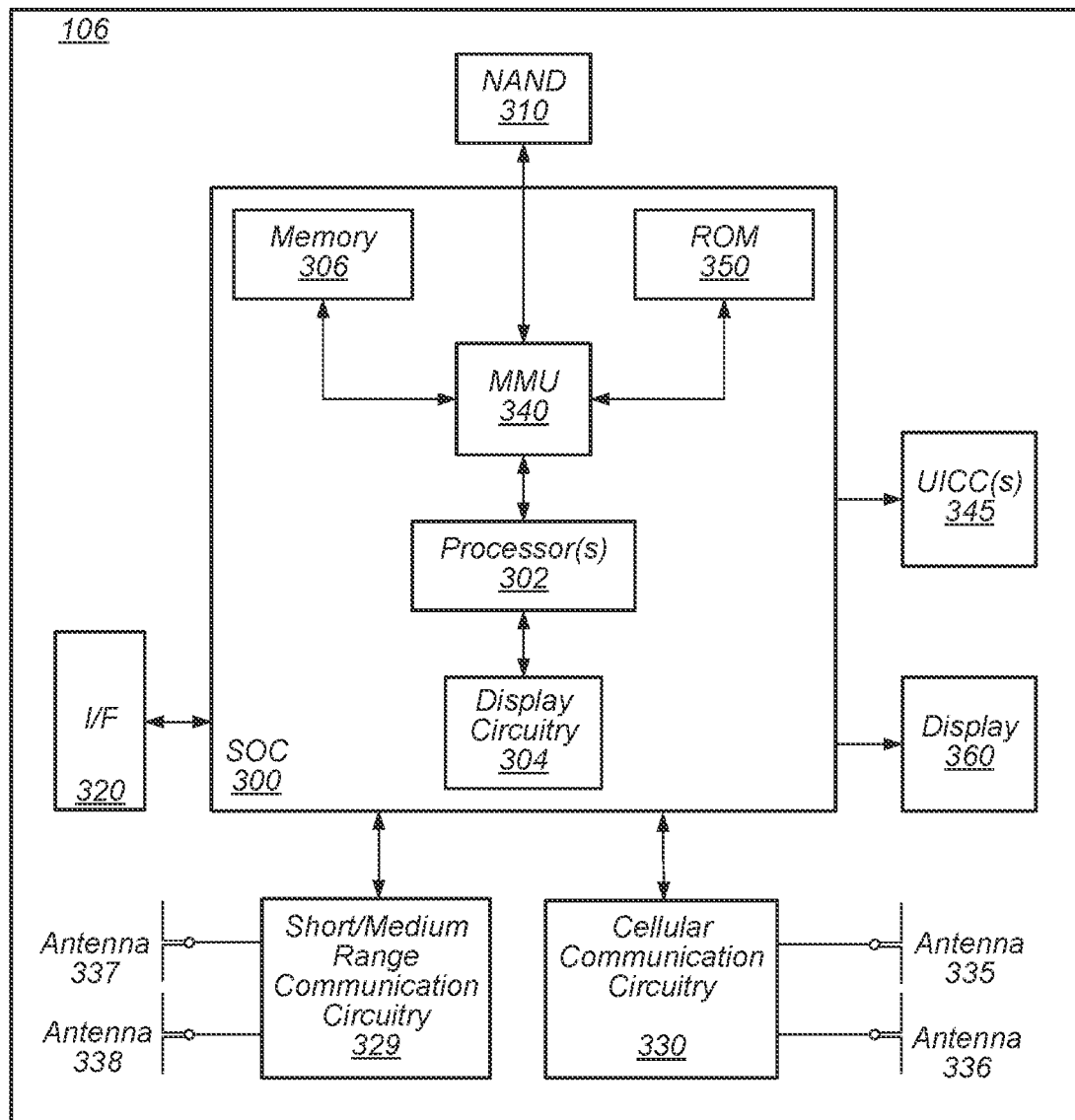
FIG. 3 illustrates an example block diagram of a UE, according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively, directly or indirectly, dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to transmit a request to attach to a first network node operating according to the first RAT and transmit an indication that the wireless device is capable of maintaining substantially concurrent connections with the first network node and a second network node that operates according to the second RAT. The wireless device may also be configured transmit a request to attach to the second network node. The request may include an indication that the wireless device is capable of maintaining substantially concurrent connections with the first and second network nodes. Further, the wireless device may be configured to receive an indication that dual connectivity (DC) with the first and second network nodes has been established.

As described herein, the communication device 106 may include hardware and software components for implementing features for using multiplexing to perform transmissions according to multiple radio access technologies in the same frequency carrier (e.g., and/or multiple frequency carriers), as well as the various other techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements and/or processors. In other words, one or more processing elements or processors may be included in cellular communication circuitry 330 and, similarly, one or more processing elements or processors may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 330. Similarly, the short range wireless communication circuitry 329 may include one or more ICs that are configured to perform the functions of short range wireless communication circuitry 329. In addition, each integrated circuit may include circuitry (e.g., first circuitry, second circuitry, etc.) configured to perform the functions of short range wireless communication circuitry 329.

Figure 4:
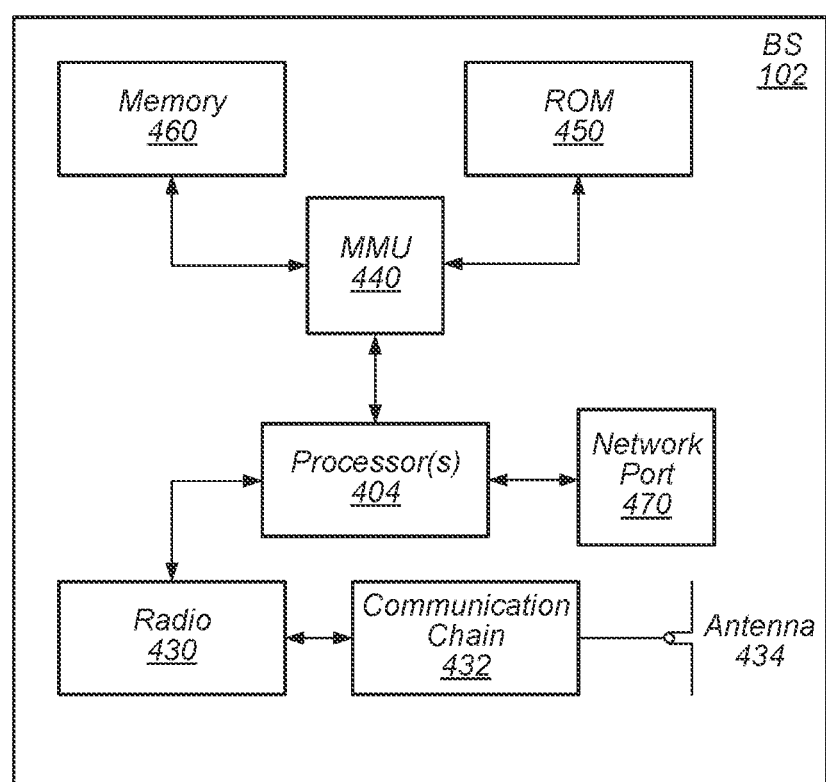
FIG. 4 illustrates an example block diagram of a BS, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The radio 430 and at least one antenna 434 may be configured to operate as a wireless transceiver and may be further configured to communicate with UE devices 106. The antenna 434 may communicate with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
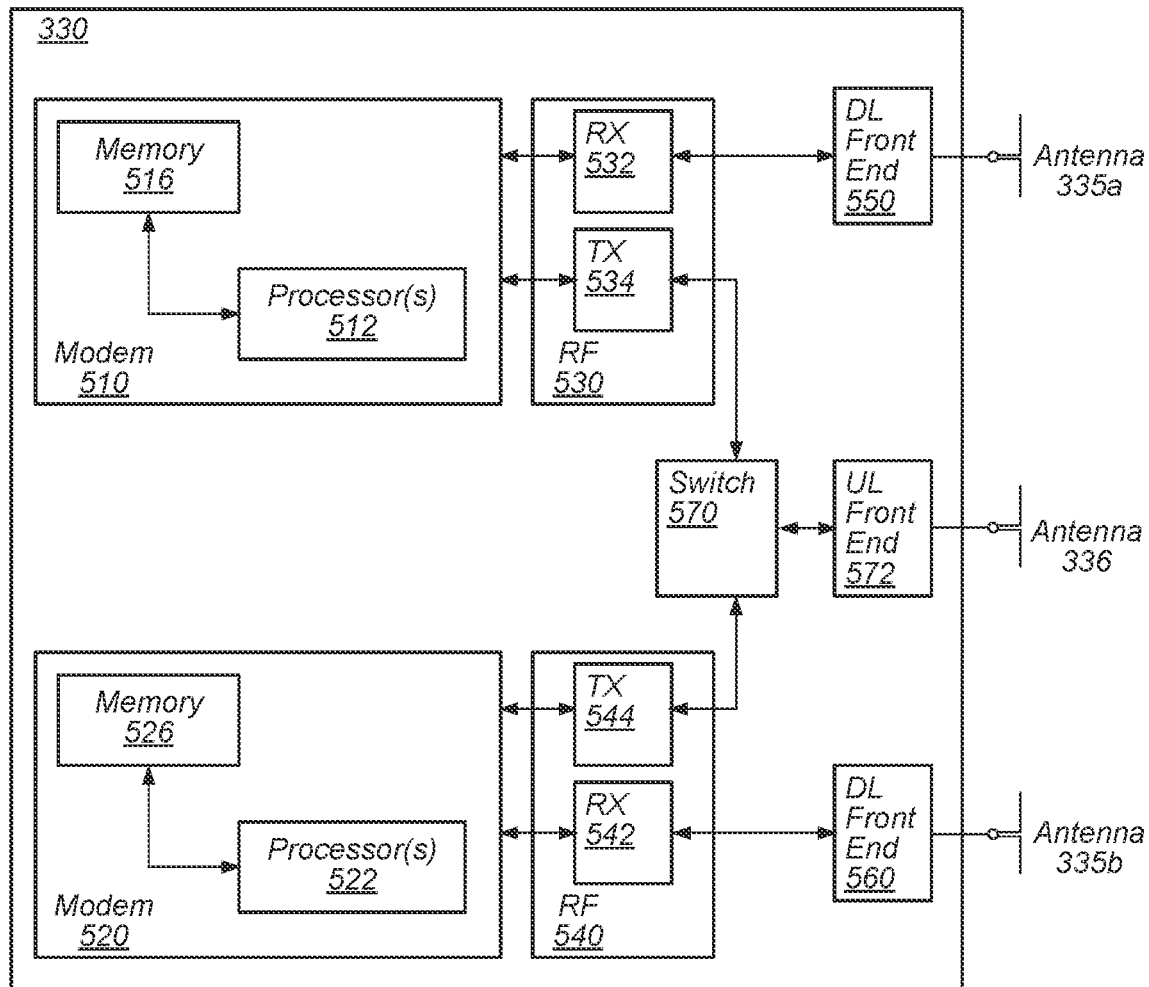
FIG. 5 illustrates an example block diagram of cellular communication circuitry, according to some embodiments.

FIG. 5—Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, are also possible. According to embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335a-b and 336 as shown (in FIG. 3). In some embodiments, cellular communication circuitry 330 may include dedicated receive chains (including and/or coupled to, e.g., communicatively, directly or indirectly, dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch (e.g., and/or combiner, multiplexer, etc.) 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, modem 510 and modem 520 may be configured to transmit at the same time, receive at the same time, and/or transmit and receive at the same time. Thus, when cellular communication circuitry 330 receives instructions to transmit according to both the first RAT (e.g., as supported via modem 510) and the second RAT (e.g., as supported via modem 520), combiner 570 may be switched to a third state that allows modems 510 and 520 to transmit signals according to the first and second RATs (e.g., via a transmit circuitry 534 and 544 and UL front end 572). In other words, the modems may coordinate communication activity, and each may perform transmit and/or receive functions at any time, as desired.

In some embodiments, the cellular communication circuitry 330 may be configured to transmit, via the first modem while the switch is in the first state, a request to attach to a first network node operating according to the first RAT and transmit, via the first modem while the switch is in a first state, an indication that the wireless device is capable of maintaining substantially concurrent connections with the first network node and a second network node that operates according to the second RAT. The wireless device may also be configured transmit, via the second radio while the switch is in a second state, a request to attach to the second network node. The request may include an indication that the wireless device is capable of maintaining substantially concurrent connections with the first and second network nodes. Further, the wireless device may be configured to receive, via the first radio, an indication that dual connectivity with the first and second network nodes has been established.

As described herein, the modem 510 may include hardware and software components for implementing features for using multiplexing to perform transmissions according to multiple radio access technologies in the same frequency carrier, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In some embodiments, processor(s) 512, 522, etc. may be configured to implement or support implementation of part or all of the methods described herein, e.g., by executing program instructions stored on a memory medium (e.g., a non-transitory computer-readable memory medium). Alternatively, the processor(s) 512, 522, etc. may be configured as a programmable hardware element, such as an FPGA, or as an ASIC, or a combination thereof. In addition, as described herein, processor(s) 512, 522, etc. may include one or more processing elements. Thus, processor(s) 512, 522, etc. may include one or more integrated circuits (ICs) that are configured to perform the functions of processor(s) 512, 522, etc. In addition, each integrated circuit may include circuitry (e.g., first circuitry, second circuitry, etc.) configured to perform the functions of processor(s) 512, 522, etc.

As described herein, the modem 520 may include hardware and software components for implementing features for using multiplexing to perform transmissions according to multiple radio access technologies in the same frequency carrier, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

Figure 6:
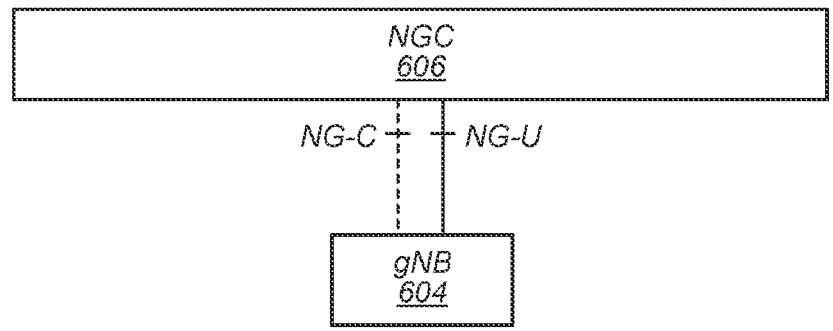
FIGS. 6 and 7 illustrate examples of a 5G NR base station (gNB), according to some embodiments.
Figure 7:
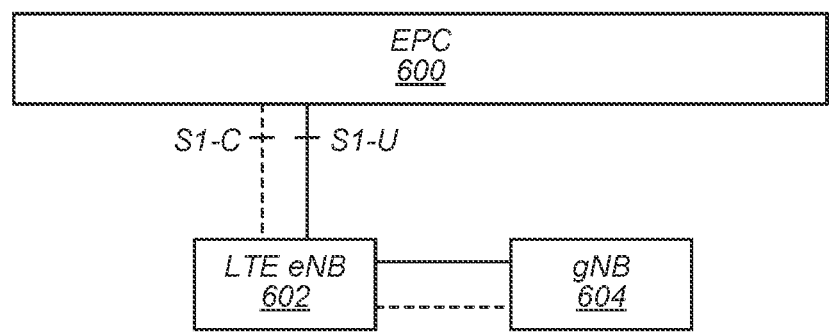

FIGS. 6-7—5G NR Architecture

In some implementations, fifth generation (5G) wireless communication will initially be deployed concurrently with other wireless communication standards (e.g., LTE). For example, whereas FIG. 6 illustrates a possible standalone (SA) implementation of a next generation core (NGC) network 606 and 5G NR base station (e.g., gNB 604), dual connectivity between LTE and 5G new radio (5G NR or NR), such as in accordance with the exemplary non-standalone (NSA) architecture illustrated in FIG. 7, has been specified as part of the initial deployment of NR. Thus, as illustrated in FIG. 7, evolved packet core (EPC) network 600 may continue to communicate with current LTE base stations (e.g., eNB 602). In addition, eNB 602 may be in communication with a 5G NR base station (e.g., gNB 604) and may pass data between the EPC network 600 and gNB 604. In some instances, the gNB 604 may also have at least a user plane reference point with EPC network 600. Thus, EPC network 600 may be used (or reused) and gNB 604 may serve as extra capacity for UEs, e.g., for providing increased downlink throughput to UEs. In other words, LTE may be used for control plane signaling and NR may be used for user plane signaling. Thus, LTE may be used to establish connections to the network and NR may be used for data services. As will be appreciated, numerous other non-standalone architecture variants are possible.

Figure 8:
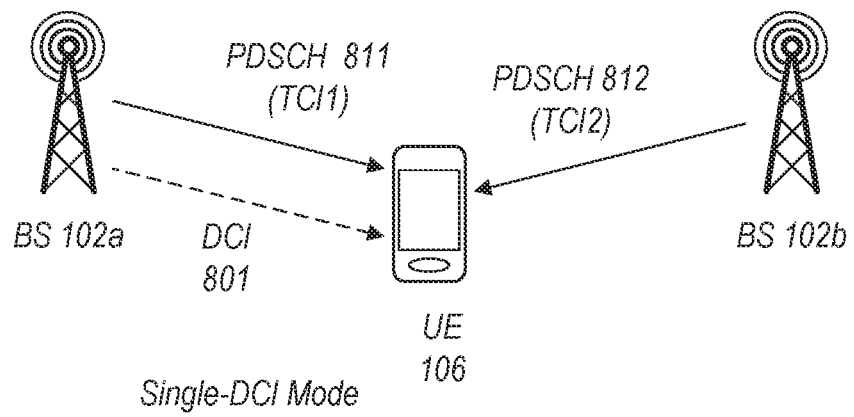
FIGS. 8 and 9 illustrate example aspects of single-DCI mode and multi-DCI mode, according to some embodiments.
Figure 9:
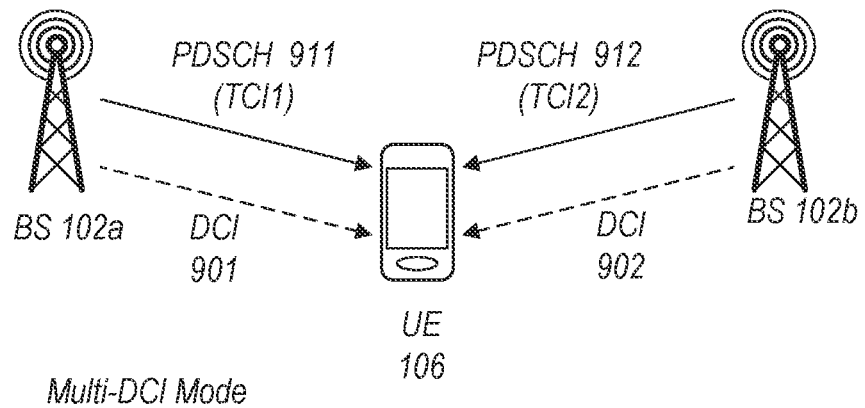

FIGS. 8-9—DCI Modes

Modern wireless communication systems, e.g., cellular systems such as 5G NR, may allow for a UE (e.g., UE 106) to communicate with one or more base stations (e.g., BS 102*a* and/or 102*b*). Note that a BS may be referred to as a transmission and reception point (TRP), and thus communication with multiple BSs may be referred to as multi-TRP operation. The UE and BSs may exchange various types of signals and data, such as application data and control information. For example, a BS may provide downlink control information (DCI) to the UE on (e.g., using) a control resource set (CORESET). The DCI may include one or more transmission configuration indicators (TCIs), among various possibilities. For example, DCI may include one or more TCI values at each of one or more TCI code points. A TCI may indicate quasi-colocation (QCL) parameters such as a downlink (DL) beam (e.g., a receive beam for the UE to use), Doppler shift, Doppler spread, average delay, delay spread, etc.

FIG. 8 illustrates a UE 106 operating in a single-DCI mode, according to some embodiments. As shown, the UE may communicate with two BSs, e.g., BS 102*a* and BS 102*b*. BS 102*a* may transmit first DCI (e.g., DCI 801). DCI 801 may include a TCI for both BS 102*a* and BS 102*b*. In the single-DCI mode, the UE may receive DCI on a CORESET and the DCI may schedule PDSCH with multiple TCIs, e.g., from multiple BSs. For example, DCI 801 may schedule PDSCH 811 and 812 using TCI1 and TCI2.

FIG. 9 illustrates a UE 106 operating in a multi-DCI mode, according to some embodiments. As shown, the UE may communicate with two BSs, e.g., BS 102*a* and BS 102*b*. BS 102*a* may transmit first DCI (e.g., DCI 901) and BS 102*b* may transmit second DCI (e.g., DCI 902). DCI 901 may include TCI (e.g., one or more TCI values) for BS 102*a* and DCI 902 may include TCI for BS 102*b*. In the multi-DCI mode, the UE may receive multiple DCIs on multiple CORESETs. Each DCI may schedule PDSCH with a single TCI, e.g., from a single BS. For example, DCI 901 may schedule PDSCH 911 using TCI1 and DCI 902 may schedule PDSCH 912 using TCI2.

DCI Mode Switching and CORESET Selection

In multi-DCI mode, a UE may monitor more CORESETs (e.g., up to 5, according to some embodiments) than in single-DCI mode (e.g., up to 3, according to some embodiments). CORESETs may be configured by radio resource control (RRC) signaling. Thus, if the BS (e.g., or other network element) decides to switch from multi-DCI mode to single-DCI mode, the switch may be signaled explicitly through RRC (e.g., RRC reconfiguration from up to 5 CORESETs to up to 3 CORESETs). Note that a UE may monitor one or more CORESETs associated with each of one or more BSs. For example, in the multi-DCI mode, the UE may monitor up to 3 CORESETs associated with a first base station and up to 2 additional CORESETs associated with a second base station.

Using RRC to trigger the switch may result in a large amount of delay (e.g., approximately 100 ms, among various possibilities) and signaling overhead. Another possible means of triggering the switch may be to schedule only up to 3 CORESETs without explicit signaling. However this implicit triggering may waste power on the UE side, e.g., because the UE may continue to monitor additional CORESETs that will not be used to carry DCI (e.g., or other physical downlink control channel (PDCCH) messages). Accordingly, the techniques disclosed herein offer improvements to reduce signaling overhead and/or latency associated with DCI mode switch (e.g., fast mode switching between single-TRP/single-DCI and multi-DCI) and to reduce UE power consumption (e.g., via improved CORESET monitoring when UE switches from multi-DCI mode into single-DCI mode).

Figure 10:
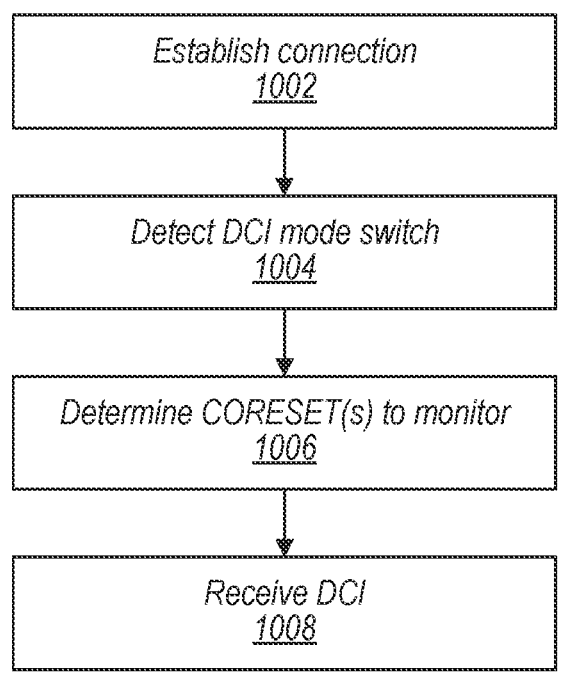
FIG. 10 is a flow chart diagram illustrating an example method of DCI mode switching and CORESET selection, according to some embodiments.

FIG. 10 is a flow diagram which illustrates exemplary aspects of DCI mode switching. Aspects of the method of FIG. 10 may be implemented by a UE 106 in communication with a cellular network (e.g., via one or more BS 102), as illustrated in and described with respect to the Figures, or more generally in conjunction with any of the computer circuitry, systems, devices, elements, or components shown in the Figures, among other devices, as desired. For example, a processor (or processors) of the UE (e.g., processor(s) 302, processor(s) associated with communication circuitry 329 or 330 such as processor(s) 512 and/or 522, etc.), base station (e.g., processor(s) 404, or a processor associated with radio 430 and/or communication chain 432, among various possibilities), or network element (e.g., any component of NGC 606, EPC 600, etc.), may cause the UE, base station, and/or network element(s) to perform some or all of the illustrated method elements. For example, a baseband processor or application processor of the UE may cause the UE to perform some or all of the illustrated method elements. Note that while at least some elements of the method are described in a manner relating to the use of communication techniques and/or features associated with 3GPP specification documents, such description is not intended to be limiting to the disclosure, and aspects of the method may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method may operate as follows.

A UE 106 may establish a connection with a cellular network via one or more BS 102 (1002), according to some embodiments. Among various possibilities, the connection may operate according to 5G NR. The UE and network may communicate in a single-DCI mode or a multi-DCI mode. The UE and network may exchange control information and/or data (e.g., payload data for an application, etc.) in the uplink and/or downlink directions. The UE and network may use a TCI for each BS 102 in communication with the UE, e.g., a first TCI with a first BS, a second TCI with a second BS, etc.

The network may determine to switch DCI modes (e.g., from single-DCI to multi-DCI, or vice versa) and the UE 106 may detect the DCI mode switch (1004), according to some embodiments. The network (e.g., BS 102 or other network element) may determine to switch modes based on any combination of various factors including movement of the UE, changing network load (e.g., traffic of the UE 106 and/or other UEs), changing channel conditions, etc. The network may signal (e.g., explicitly or implicitly) the mode switch and the UE may detect the mode switch in any of various ways, as further described below.

In some embodiments, the mode switch may be signaled (e.g., implicitly) based on a predefined rule.

As a first example of such a predefined rule, a DCI mode may be signaled by the network and determined by the UE based on a number of TCI states (e.g., N) that corresponds to a TCI code point in DCI. A DCI message, e.g., transmitted on physical downlink control channel (PDCCH) resources (e.g., of a CORESET) may include a string of TCI code points. Each code point may identify one or more TCI states/values (e.g., one or more beams for the UE to use). A particular TCI code point for the UE to examine to determine the number of TCI states may be configured by media access control (MAC) control element (CE), among various possibilities. If the number of TCI states is greater than 1 (e.g., N>1), for any TCI code point in the DCI, the UE may operate in single-DCI mode. In other words, the UE may determine that a TCI code point in DCI indicates multiple TCI values, and may thus conclude that the different TCI values correspond to different BSs (e.g., and therefore operate in multi-DCI mode). Otherwise, if the number of TCI states is not greater than 1 (e.g., N<=1), the UE may operate in multi-DCI mode. Thus, the DCI mode may be dynamically switched based on he indicated TCI field in PDCCH; e.g., the UE may select a second DCI mode based on whether a number of TCI states at any TCI code point in the DCI is greater than 1.

Figure 11:
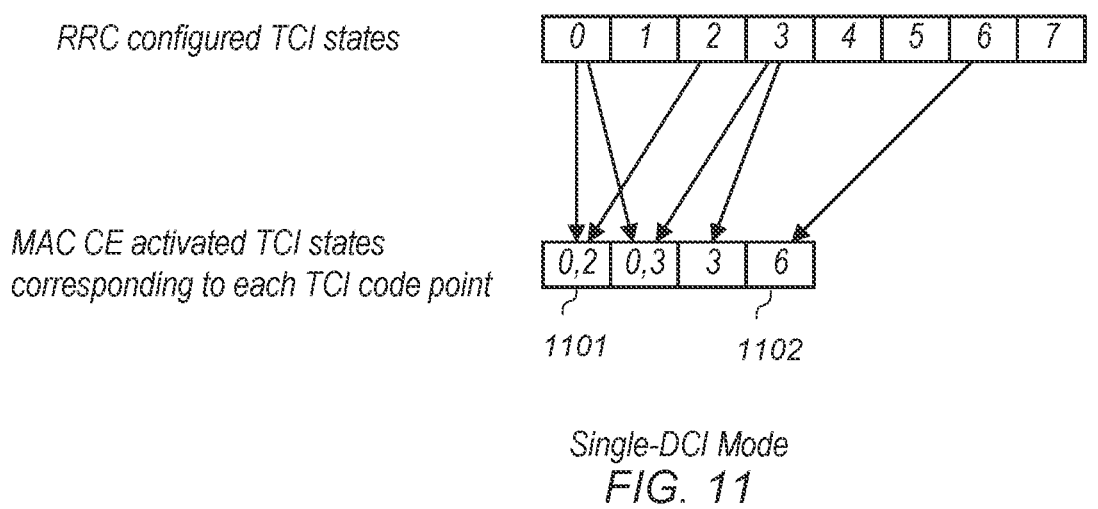
FIGS. 11 and 12 illustrate example aspects of single-DCI mode and multi-DCI mode in relation to transmission configurations, according to some embodiments.
Figure 12:
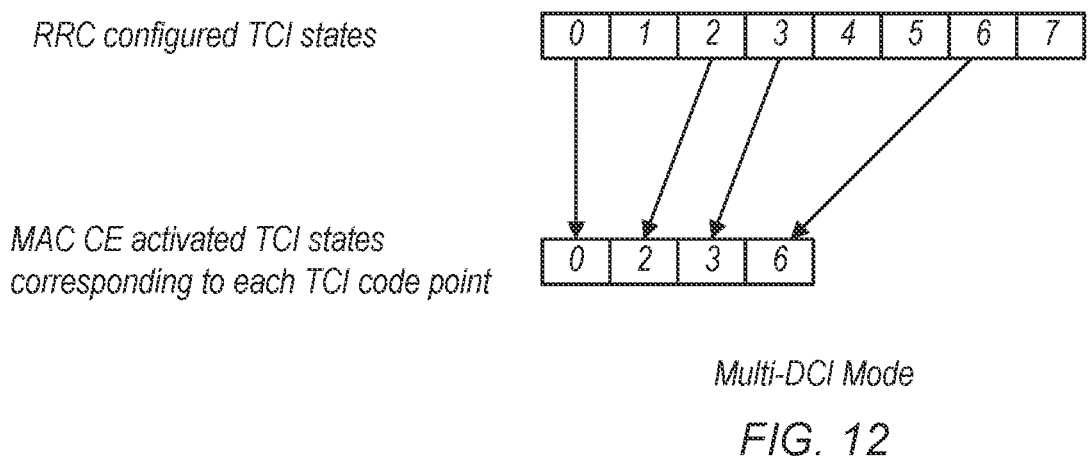

FIGS. 11 and 12 illustrate this first example of a predefined rule. As shown in FIG. 11, a first TCI code point (1101) of four TCI code points includes two TCI values (e.g., 0, 2). A BS 102 may transmit a DCI including such a TCI code point to signal to the UE 106 to operate in single-DCI mode. It will be appreciated that other TCI code points (e.g., the fourth code point 1102) in the DCI may include single TCI values. These TCI code points may be selected (e.g., activated by a MAC CE) in order to cause the UE to communicate with a single BS 102. However, because at least one TCI code point in the DCI includes multiple TCI values, the UE may determine to operate in single-DCI mode (e.g., because the DCI may be used to schedule multiple TCIs). As shown in FIG. 12, all TCI code points in the DCI include single TCI values. Such a DCI may be transmitted to the UE and may signal the UE to operate in a multi-DCI mode. Notably, no TCI code point in this DCI may configure multiple TCIs, e.g., as may be used to communicate with multiple BSs, accordingly, the UE may determine that each BS is transmitting independent DCI (e.g., multi-DCI mode).

As a second example of such a predefined rule, a DCI mode may be signaled by the network and determined by the UE based on a configured higher layer index (e.g., an index indicating a particular BS, e.g., TRP) per monitored CORESET and hybrid automatic repeat request (HARQ) feedback mode (e.g., joint or separate feedback, e.g., providing HARQ acknowledgements for communications from multiple BSs jointly to a single BS, or separately to individual BSs). A HARQ feedback mode configured as separate feedback may indicate multi-DCI mode. Else, e.g., in the case of joint feedback, different higher layer index values configured for different CORESETs may indicate multi-DCI mode. If neither of the previous conditions (e.g., separate feedback or different higher layer index values for different CORESETs) is true, then single-DCI mode may be selected. In some embodiments, the higher layer index per CORESET may be updated by MAC CE, e.g., to decrease latency relative to performing such an update through RRC. For multi-DCI mode, one or all the TCI code points in DCI may not correspond to more than one TCI state.

In some embodiments, the mode switch may be signaled (e.g., explicitly) via RRC and/or MAC CE. For example, an initial DCI mode may be configured via RRC, e.g., at the time of connection establishment in 1002. A mode switch may be signaled by the network to the UE via a MAC CE or via an RRC reconfiguration.

In some embodiments, the mode switch may be signaled (e.g., implicitly) based on a most recent group based beam reporting (e.g., in a slot k slots prior to a current slot, where the number of slots k may be configured as desired). In other words, the UE may attempt to identify a set of beams (e.g., with sufficiently good signal strength/quality) that can be used together (e.g., for simultaneous/concurrent reception). If such a set of beams is identified, multi-DCI mode may be used; if not, single-DCI mode should be used. Thus, the UE may be viewed as the initial decision maker, e.g., for selecting a DCI mode. However, in the case that the UE recommends (e.g., or indicates the possibility of) using a multi-DCI mode, the network may still determine to use a single-DCI mode (e.g., based on the network's scheduling decisions). For example, a UE may report that multiple beams may be used for simultaneous reception in a group based beam report. However, notwithstanding the indication from the UE that multi-DCI mode is possible, the network may select a single-DCI mode in the scheduling process. Among various possibilities, the network may signal this decision to the UE using further DCI, such as a MAC CE, thus reducing or avoiding the need for the UE to monitor CORESETs associated with a second BS. In other words, group based beam reporting may be complementary to using a MAC CE to activate/deactivate CORESETs as described herein. For example, if a network activates a CORESET with a same higher layer index, the UE may recognize the activation as a single-DCI mode. This approach may be viewed as a predefined rule based on group based beam reporting. In some embodiments, if the UE cannot support group based beam reporting (e.g., implying single-DCI mode), the same QCL typeD (e.g., spatial reception parameter) may be configured for the TCI for multiple BSs, e.g., for physical data shared channel (PDSCH)). In other words, if a UE cannot identify any downlink beams from multiple BSs that can be received simultaneously with different Rx beams, the only way to receive beams from multiple BSs simultaneously may be by a single Rx beam. Thus, the TCI state should share the same QCL-typeD assumption, e.g., in TCI associated with each of the BSs. Similarly, the same QCL typeD may be configured for the TCI for PDCCH of multiple BSs. Thus, PDCCH from multiple BSs may be transmitted with the same QCL-typeD and duplexed, e.g., time-division, frequency-division, or both. In some embodiments, a UE may report whether it supports multi-DCI mode in a UE capability report. Such a capability report may be transmitted before, after, or concurrently with a group based beam report.

Figure 13:
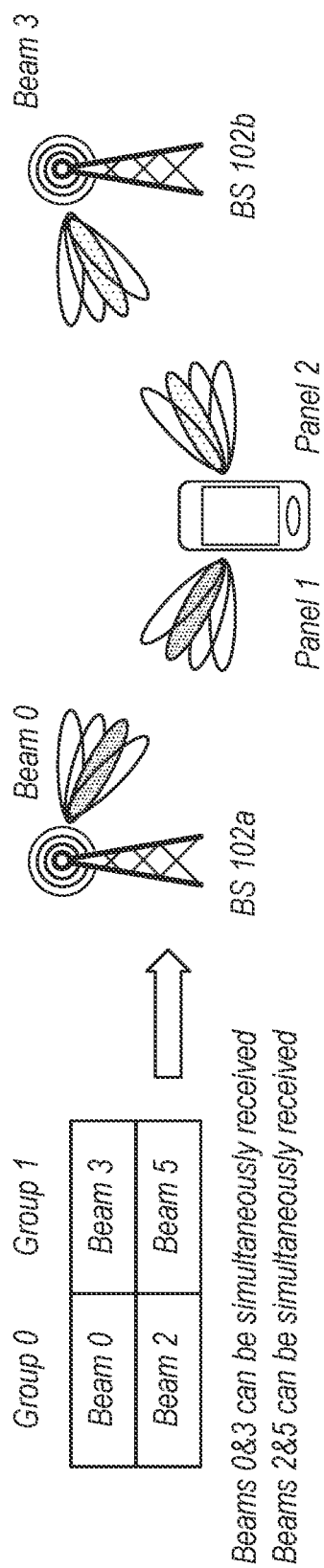
FIGS. 13 and 14 illustrate example aspects of single-DCI mode and multi-DCI mode in relation to group based beam reporting, according to some embodiments.
Figure 14:
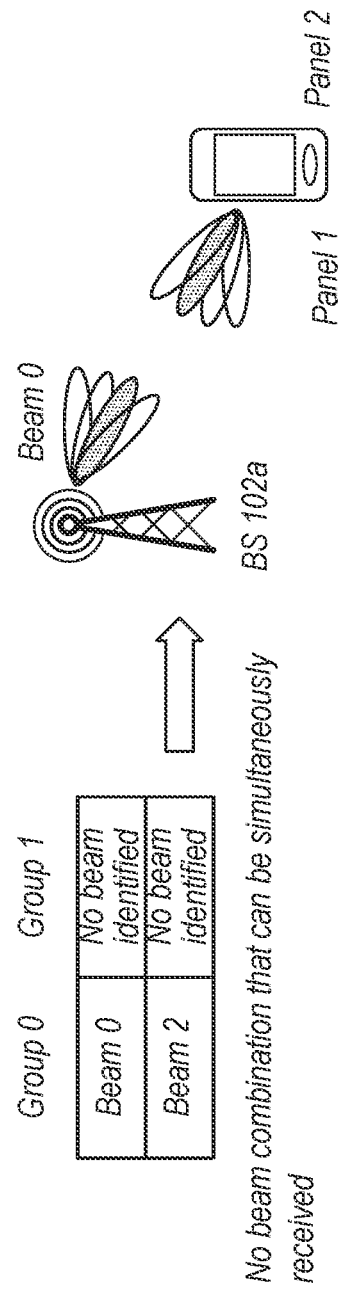

In order to perform such group based beam reporting, a UE 106 may identify groups of beams which are received using the same panel/array of antennas and further identify which beams cannot be used for simultaneous reception, and transmit indications of such groups to the network (e.g., BS 102). For example, beams associated with different panels may be simultaneously received, among various possibilities. FIGS. 13 and 14 illustrate such group based reporting. As shown in FIG. 13, a UE 106 may have two panels (e.g., panel 1 and panel 2) of antennas. Group 0, including beams 0 and 2, may be received using panel 1. Similarly, group 1, including beams 3 and 5, may be received using panel 2. The UE may indicate to the network that beams 0 and 3 may be used for simultaneous reception. Further, the UE may indicate that any beam from group 0 can be used with any beam from group 1 (e.g., beams 2 and 5, beams 2 and 3, or beams 0 and 5 may be used for simultaneous reception). As shown, the UE may use single-DCI mode to communicate with BS 102a (e.g., using beam 0) and BS 102b (e.g., using beam 3). It will be appreciated that the UE (and/or BS) may incorporate information from signal measurements in group based beam reporting, e.g., to exclude beams which are not satisfactory for communications. For example, if a beam's reference signal received power (RSRP) and/or signal to interference and noise ratio (SINR) are below corresponding RSRP and/or SINR threshold(s), the UE may consider that beam as not available, and may exclude it from a report of available beams (e.g., or otherwise indicate that such a beam(s) should not be used). In some embodiments, the UE may indicate multiple groups of beams for simultaneous reception, e.g., any one beam of the beams in a first set may be simultaneously received with any one of the beams of a second set. As shown in FIG. 14, under some conditions no combination of beams suitable for simultaneous reception may be found, e.g., due to channel conditions, orientation or configuration of the UE, etc. Accordingly, the UE may operate in single-DCI mode, e.g., BS 102a may provide DCI to the UE and the UE may not communicate with other BSs.

As one example of using group based beam reporting, a UE (e.g., operating in a first DCI-mode, e.g., either single-DCI mode or multi-DCI mode) may use a first beam to receive communications from a first base station. At a first time, the UE may provide a report to a network indicating whether any other beams with satisfactory signal characteristics may be used for simultaneous reception with the first beam, e.g., in order to enable communications with a second base station. The report may identify any such satisfactory beams. At a second time, e.g., at least k slots after the first time, the UE may determine a second DCI mode based on the content of the group based beam report. For example, if the group based beam report identifies at least one suitable beam the UE may conclude that multi-DCI mode is in use (e.g., unless the network explicitly signals single-DCI mode). Alternatively, if the group based beam report does not identify any suitable beam, the UE may conclude that a single-DCI mode and/or communication with a single BS is in use.

It will be appreciated that the network may signal and the UE may detect a DCI mode periodically, e.g., even when no mode switch occurs. Thus, a first DCI mode in use before checking for a second DCI mode may or may not be the same as the second DCI mode. For example, a network may signal and a UE may check a DCI mode periodically. For example, a UE may periodically evaluate a predefined rule and/or perform group based reporting to determine a DCI mode. Thus, some periodic determinations of a DCI mode may result in a DCI mode switch and others may not. For example, at a first time a UE may perform a DCI mode determination that results in a DCI mode switch; at a second time the UE may perform a second DCI mode determination that does not result in a DCI mode switch. The two DCI mode determinations may be performed in the same manner or in different manners (e.g., according to different embodiments of the various embodiments described above).

In association with (e.g., or in response to) the mode switch, the network may signal (e.g., explicitly or implicitly) and the UE may determine which CORESET(s) to monitor (1006), according to some embodiments. For example, when a UE switches from multi-DCI mode to single-DCI mode, it may reduce the number of CORESETs to monitor, e.g., from 5 to 3, among various possibilities. The signaling and determination of CORESETs to monitor may be based on one or more of various scheduling restrictions and/or dropping rules.

In some embodiments, a set of CORESETs (e.g., up to 3) may be configured for an active bandwidth part (BWP), e.g., in a single-DCI mode. For example, such a configuration may be performed using RRC reconfiguration and/or MAC CE signaling. For example, a MAC CE may be configured to identify and/or update a subset of CORESETs for the UE to monitor. Such a MAC CE may reduce latency of such a reconfiguration relative to using RRC. This approach may be implemented as a restriction that a network may only configure (e.g., by RRC) and/or reconfigure (e.g., by MAC CE) up to 3 CORESETs per BWP. For example, a technical specification may state something like "UE shall expect up to 3 CORESETs should be configured for a BWP."

In some embodiments, the UE may select a subset of CORESET(s) to monitor (e.g., if more than 3 CORESETs are configured, e.g., for an active BWP). The CORESET(s) to monitor may be selected based on any of various factors. For example, the CORESET(s) to monitor may be selected based on CORESET ID, higher layer index configured per CORESET, periodicity of search space associated with a CORESET, and/or type of search space associated with a CORESET (e.g., common search space (CSS) or UE specific search space (USS)). In some embodiments, if a higher layer index is not configured, it may be considered to be 0. It will be appreciated that these various factors (and/or possibly additional factors) may be considered individually and/or in combination in various ways to select a CORESET. As one example, only CORESETs with higher layer index equal to 0 (and/or 1, according to some embodiments) may be selected. As another example, a number (e.g., 3) of CORESETs with the lowest CORESET IDs may be selected. As another example, the UE may select CORESETs associated with CSS with lowest IDs first, e.g., before selecting CORESETs with USS with lowest IDs. In other words, first priority may be given to CORESETs with CSS and an ID below a first threshold and second priority may be given to CORESETs with USSS and an ID below a second threshold (e.g., which may be same or different than the first threshold). As another example, CORESETs with higher layer index less than or equal to a threshold may be selected in order of periodicity (e.g., from shortest to longest, or from longest to shortest, etc.).

In some embodiments, the CORESETs to be monitored may be configured by higher layer signaling, e.g., if more than 3 CORESETs are configured. For example, a MAC CE may be used to activate and/or deactivate CORESET monitoring. For example, a network may configure any number (e.g., potentially >3) CORESETs by RRC, but a BS 102 may signal to the UE which CORESET(s) are activated (e.g., and should be monitored) by MAC CE. As shown in FIG. 15, such a MAC CE may include a bitmap and/or serving cell index (and/or serving cell group index). Such a bitmap may identify which CORESETs the UE should monitor and/or which CORESETs it should not monitor. In some embodiments, a CORESET with ID 0 may not be deactivated. In some embodiments, up to 3 CORESETs may be activated for a BWP.

The UE 106 may receive DCI transmitted by one or more BSs 102 (1008), according to some embodiments. The UE may receive the DCI according to the DCI mode and/or by monitoring the selected CORESETs. For example, if the signaled DCI mode is a multi-DCI mode, the UE may receive DCI on one or more CORESET associated with two or more BSs. Each BS may provide DCI relevant to its own communications with the UE. For example, if the signaled DCI mode is a single-DCI mode, the UE may receive DCI from a single BS (e.g., on one or more CORESET associated with that BS), and that DCI may be relevant to communications with multiple BSs.

Additional Information and Examples

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus comprising:
a processor configured to cause a user equipment device (UE) to:
receive signaling including one or more higher layer indices for two or more control resources sets (CORESETs);
determine whether to operate in a single DCI or multi DCI mode, wherein:
if different higher layer indices of the one or more higher layer indices are configured for the two or more CORESETs, a multi-DCI mode is determined; or
otherwise, a single-DCI mode is determined; and
receive one or more DCIs according to the determined DCI mode.

2. The apparatus of claim 1, wherein the processor is further configured to cause the UE to perform a second determination of a DCI mode at a later time, wherein the second determination does not result in a DCI mode switch.

3. The apparatus of claim 2, wherein the second determination is not based on whether different higher layer indices are configured for the two or more CORESETs.

4. The apparatus of claim 1, wherein a determination of whether a number of transmission configuration indicator (TCI) states is greater than 1 is performed periodically.

5. The apparatus of claim 1, wherein the single-DCI mode includes receiving DCI from a single base station that is applicable to at least one additional base station.

6. The apparatus of claim 1, wherein the determined DCI mode is a single-DCI mode, wherein the processor is further configured to cause the UE to determine a number of CORESETs to monitor in the single-DCI mode.

7. The apparatus of claim 6, wherein to determine the number of CORESETs includes receiving a media access control (MAC) control element (CE).

8. The apparatus of claim 1, further comprising a radio operably coupled to the processor.

9. A method comprising:
receiving signaling including one or more higher layer indices for two or more control resources sets (CORESETs);
determining whether to operate in a single DCI or multi DCI mode, wherein:
if different higher layer indices of the one or more higher layer indices are configured for the two or more CORESETs, a multi-DCI mode is determined; or
otherwise, a single-DCI mode is determined; and
receiving one or more DCIs according to the determined DCI mode.

10. The method of claim 9, further comprising performing a second determination of a DCI mode at a later time, wherein the second determination does not result in a DCI mode switch.

11. The method of claim 10, wherein the second determination is not based on whether different higher layer indices are configured for the two or more CORESETs.

12. The method of claim 9, further comprising periodically performing determination of whether a number of transmission configuration indicator (TCI) states is greater than 1.

13. The method of claim 9, wherein the single-DCI mode includes receiving DCI from a single base station that is applicable to at least one additional base station.

14. The method of claim 9, wherein the determined DCI mode is a single-DCI mode, wherein the method further comprises determining a number of CORESETs to monitor in the single-DCI mode.

15. A method comprising:
transmitting, to a user equipment (UE), signaling including one or more higher layer indices for two or more control resources sets (CORESETs);
determining whether to operate in a single DCI or multi DCI mode, wherein:
if different higher layer indices of the one or more higher layer indices are configured for the two or more CORESETs, a multi-DCI mode is determined; or
otherwise, a single-DCI mode is determined; and transmitting one or more DCIs according to the determined DCI mode.

16. The method of claim 15, further comprising performing a second determination of a DCI mode at a later time, wherein the second determination does not result in a DCI mode switch.

17. The method of claim 16, wherein the second determination is not based on whether different higher layer indices are configured for the two or more CORESETs.

18. The method of claim 15, further comprising periodically performing determination of whether a number of transmission configuration indicator (TCI) states is greater than 1.

19. The method of claim 15, wherein the single-DCI mode includes transmitting DCI from a single base station that is applicable to at least one additional base station.

20. The method of claim 15, wherein the determined DCI mode is a single-DCI mode, wherein the method further comprises determining a number of CORESETs to use with the UE in the single-DCI mode.

* * * * *